US00RE49713E

(19) United States
(12) Reissued Patent
Sugahara

(10) Patent Number: US RE49,713 E
(45) Date of Reissued Patent: Oct. 24, 2023

(54) DEVICES, METHODS AND SYSTEMS FOR CLOSE PROXIMITY IDENTIFICATION OF UNMANNED AERIAL SYSTEMS

(71) Applicant: Aozora Aviation, LLC, Salem, OR (US)

(72) Inventor: Thomas Kenji Sugahara, Salem, OR (US)

(73) Assignee: Aozora Aviation, LLC, Salem, OR (US)

(21) Appl. No.: 17/563,988

(22) Filed: Dec. 28, 2021

Related U.S. Patent Documents

Reissue of:
(64) Patent No.: 10,825,345
Issued: Nov. 3, 2020
Appl. No.: 15/917,390
Filed: Mar. 9, 2018

U.S. Applications:
(60) Provisional application No. 62/469,223, filed on Mar. 9, 2017.

(51) Int. Cl.

| | |
|---|---|
| ***G08G 5/00*** | (2006.01) |
| ***H04W 12/06*** | (2021.01) |
| ***H04W 4/80*** | (2018.01) |
| ***H04W 4/40*** | (2018.01) |
| ***G06F 16/955*** | (2019.01) |

(Continued)

(52) U.S. Cl.
CPC ..... *G08G 5/0013* (2013.01); *G06F 16/955* (2019.01); *G08G 5/0052* (2013.01); *G08G 5/0069* (2013.01); *H04L 63/083* (2013.01); *H04L 63/0876* (2013.01); *H04W 4/40* (2018.02); *H04W 4/80* (2018.02); *H04W 12/068* (2021.01)

(58) Field of Classification Search
CPC . H04L 63/0876; H04L 63/083; G06F 16/955; G08G 5/0013; G08G 5/0052; G08G 5/0069; H04W 4/80; H04W 4/40; H04W 12/06; H04W 12/08; H04W 12/10
See application file for complete search history.

(56) References Cited

U.S. PATENT DOCUMENTS 5,528,234 A 6/1996 Mani et al.
5,570,095 A 10/1996 Drouilhet, Jr. et al.
(Continued)

OTHER PUBLICATIONS

Jensen et al. "Drone Identification and Tracking in Denmark, Technical Report", Oct. 2016, pp. 1-64 (Year: 2016).*
(Continued)

*Primary Examiner* — Minh Dieu Nguyen
(74) *Attorney, Agent, or Firm* — SEED INTELLECTUAL PROPERTY LAW GROUP LLP

(57) ABSTRACT

Embodiments described herein include an electronic beacon system mounted to an unmanned aerial system (UAS) broadcasting identification and sensor data including a UAS identification code, global positioning system data and other telemetry information. In certain embodiments, identification and global positioning system data of the unmanned aerial system is transmitted to and displayed upon a mobile handheld device. Other embodiments include using the identification data to ascertain the identity of the owner/operator of an unmanned aerial system. Related systems, hardware, firmware, and software are disclosed.

20 Claims, 4 Drawing Sheets

(51) Int. Cl.
*H04L 29/06* (2006.01)
*H04L 9/40* (2022.01)

(56) References Cited

U.S. PATENT DOCUMENTS

| | | | | |
|---|---|---|---|---|
| 6,681,158 | B2 | 1/2004 | Griffith | |
| 8,886,459 | B2 | 11/2014 | Stefani et al. | |
| 9,087,451 | B1 | 7/2015 | Jarrell | |
| 9,412,278 | B1 | 8/2016 | Gong et al. | G08G 5/0008 |
| 9,646,502 | B1 * | 5/2017 | Gentry | G08G 5/0013 |
| 9,805,273 | B1 * | 10/2017 | Seeber | H04R 29/00 |
| 10,365,646 | B1 * | 7/2019 | Farnsworth | G05D 1/00 |
| 10,370,093 | B1 * | 8/2019 | Beckman | G01S 1/753 |
| 10,420,062 | B2 * | 9/2019 | Kim | G01S 5/10 |
| 2013/0217332 | A1 * | 8/2013 | Altman | H04W 12/04 455/41.2 |
| 2014/0103104 | A1 * | 4/2014 | Jover | H04L 65/1069 235/375 |
| 2014/0342760 | A1 | 11/2014 | Moldavsky et al. | |
| 2015/0106900 | A1 * | 4/2015 | Pinski | H04W 12/068 726/7 |
| 2015/0260824 | A1 * | 9/2015 | Malveaux | G08G 5/0008 340/870.09 |
| 2016/0078759 | A1 * | 3/2016 | Nerayoff | G06T 7/248 701/3 |
| 2016/0140851 | A1 * | 5/2016 | Levy | G08G 5/045 701/3 |
| 2016/0196525 | A1 * | 7/2016 | Kantor | H04W 4/027 705/330 |
| 2016/0247404 | A1 * | 8/2016 | Srivastava | G08G 5/0091 |
| 2017/0034700 | A1 * | 2/2017 | Cohen | H04W 12/50 |
| 2017/0039424 | A1 * | 2/2017 | Nerayoff | G08G 1/052 |
| 2017/0160740 | A1 * | 6/2017 | Srivastava | B64C 39/024 |
| 2017/0160751 | A1 * | 6/2017 | Pierce | B64C 39/024 |
| 2017/0248969 | A1 * | 8/2017 | Ham | B64C 39/024 |
| 2017/0255802 | A1 * | 9/2017 | Falk | G06K 7/1413 |
| 2017/0261604 | A1 * | 9/2017 | Van Voorst | G05D 1/0094 |
| 2018/0068567 | A1 * | 3/2018 | Gong | H04W 4/022 |
| 2018/0086451 | A1 * | 3/2018 | Vaughn | G08G 5/0069 |
| 2018/0090012 | A1 * | 3/2018 | Jo | G05D 1/0022 |
| 2018/0091908 | A1 * | 3/2018 | Goel | G08G 5/0069 |
| 2018/0107209 | A1 * | 4/2018 | Hardee | G08G 1/20 |
| 2018/0111683 | A1 * | 4/2018 | Di Benedetto | G06Q 30/04 |
| 2018/0114450 | A1 * | 4/2018 | Glaab | G05D 1/0055 |
| 2018/0128895 | A1 * | 5/2018 | Seeber | G08G 5/0026 |
| 2018/0129881 | A1 * | 5/2018 | Seeber | G06T 7/11 |
| 2018/0141656 | A1 * | 5/2018 | Heinonen | G08G 5/0069 |
| 2018/0144644 | A1 * | 5/2018 | Heinonen | G01S 19/13 |
| 2018/0157255 | A1 * | 6/2018 | Halverson | B64C 39/024 |
| 2018/0165968 | A1 * | 6/2018 | Clark | G08G 5/003 |
| 2018/0165972 | A1 * | 6/2018 | Zelenka | G08G 5/0026 |
| 2018/0194455 | A1 * | 7/2018 | Park | G08C 17/02 |
| 2018/0222600 | A9 * | 8/2018 | Matos | G05D 1/042 |
| 2018/0253092 | A1 * | 9/2018 | Trapero Esteban | H04W 12/06 |
| 2018/0275654 | A1 * | 9/2018 | Merz | G08G 5/0086 |
| 2018/0293898 | A1 * | 10/2018 | Redmann | G08G 5/006 |
| 2018/0305012 | A1 * | 10/2018 | Ichihara | G05D 1/106 |
| 2018/0357909 | A1 * | 12/2018 | Eyhorn | G08G 5/0013 |
| 2018/0364741 | A1 * | 12/2018 | Van Voorst | G06K 9/0063 |
| 2018/0373243 | A1 * | 12/2018 | Russell | G05D 1/0088 |
| 2019/0012922 | A1 * | 1/2019 | Selander | G08G 5/0013 |
| 2019/0019418 | A1 * | 1/2019 | Tantardini | G08G 5/0013 |
| 2019/0031346 | A1 * | 1/2019 | Yong | A01B 79/005 |
| 2019/0051190 | A1 * | 2/2019 | Russell | G05D 1/0027 |
| 2019/0075543 | A1 * | 3/2019 | Kim | G01S 5/0236 |
| 2019/0139421 | A1 * | 5/2019 | Nilsson | G05D 1/106 |
| 2019/0147747 | A1 * | 5/2019 | Arngren | G05D 1/106 701/2 |
| 2019/0295426 | A1 * | 9/2019 | Nilsson | G08G 5/0043 |
| 2020/0158814 | A9 * | 5/2020 | Troxler | G01C 21/005 |

OTHER PUBLICATIONS

Jensen et al., "Drone Identification and Tracking in Denmark," Oct. 2016, 65 pages.

Ganti-Implementation of Detection and Tracking Mechanism for Small UAS, 2016 International Conference on Unmanned Aircraft Systems (ICUAS), Jun. 7-10, 2016, Arlington, VA, pp. 1254-1260 (Year: 2016).*

* cited by examiner

Unauthorized Handheld Mobile Device

Authorized Handheld Mobile Device
Additional Screens

DEVICES, METHODS AND SYSTEMS FOR CLOSE PROXIMITY IDENTIFICATION OF UNMANNED AERIAL SYSTEMS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION(s)*

*The instant application, application Ser. No. 17/563,988, filed Dec. 28, 2021 which is a reissue application of U.S. application Ser. No. 15/917,390, filed Mar. 9, 2018, now U.S. Pat. No. 10,825,345 which claims priority to U.S. Provisional Application No. 62/469,223, filed on Mar. 9, 2017.*

*TECHNICAL* FIELD

The inventive subject matter relates to systems and methods to identify unmanned aerial systems and to identify [the owner/operators] *an owner/operator* of unmanned aerial systems.

BACKGROUND

Unmanned aerial systems (sometimes referred-to in the art as "drones") are proliferating at an amazing rate. People are buying them for business, hobby and public purposes. However, there is no means of identifying [the] *an* owner/operator of an unmanned aerial system while it is in the air. In most instances the airframes are too small for identification numbers. Unmanned aerial systems have been spotted in prohibited areas with no possibility of tracking down the owner/operator. The Federal Aviation Administration is proposing that all unmanned aerial systems must be registered to prevent bad behavior. However, registration would only be effective if law enforcement was able to identify the owner/operator. In most instances, the unmanned aerial system is flown away and the owner/operator is never found. There is a significant need for a system that allows for the identification of an unmanned aerial system while it is in the air, preferably with the capture of relevant data such as altitude and positioning information of the unmanned aerial system, and to tie the unmanned aerial system to its owner/operator.

Presently known art does not sufficiently address and solve these problems. The following represents a list of known related art:

| Patent/Publication No. | Issued Date | Filed |
|---|---|---|
| U.S. Pat. No. 5,570,095 | Oct. 29, 1996 | Apr. 1, 1994 |
| U.S. Pat. No. 6,681,158 | Jan. 20, 2004 | Sep. 19, 2002 |
| U.S. Pat. No. 9,087,451 | Jul. 21, 2015 | Jun. 28, 2014 |
| U.S. Pat. No. 5,528,234 | Jun. 18, 1996 | Feb. 1, 1994 |
| U.S. Pat. No. 8,886,459 | Nov. 11, 2014 | Mar. 11, 2013 |
| U.S. Pat. No. 9,412,278 | Aug. 9, 2016 | Nov. 16, 2015 |
| US 2014/0342760 | Nov. 20, 2014 | Aug. 15, 2011 |

(The teachings of each of the above-listed references are herein incorporated by reference.)

Accordingly, there is a need for improved *unmanned aerial vehicle* (UAV) identification systems. For example, there is a need for improved systems and methods for receiving UAV identification data, processing the data, and transferring the data to other relevant devices.

*BRIEF* SUMMARY

Recognizing the deficiencies of prior methodologies, hardware, and other systems, the inventive subject matter provides methods, hardware and systems for the short-range transmission of information from unmanned aerial systems to mobile and other ground-based or aerial devices, and, more particularly, but not exclusively, to users thereof. While such methods, hardware and systems may be employed to deliver a wide array of information, they find particular application in the delivery of identification codes and sensor data when ground-based or aerial users need to identify unmanned aerial systems, their location, their altitude and other information.

According to a first aspect, the inventive subject matter provides a method for providing information to a user, comprising the steps of: (a) transmitting a signal from an unmanned aerial system, wherein the unmanned aerial system is positioned within a space and the signal comprises an identification code, along with global positioning system data and other sensor data; (b) receiving the signal on a mobile device for a user located within range of the unmanned aerial system transmitter; (c) saving the identification code, along with global positioning system data and other sensor data to the handheld mobile device; (d) in some embodiments, retrieving information from at least one database using the identification code in the signal wherein the information retrieved by the mobile device is gated through a credentialing system that is a function of the privileges of the user; and (e) displaying on the mobile device the unmanned aerial system owner and system information associated with the identification code.

According to a second aspect, this description discloses a computing environment comprising a processor, a memory, and instructions stored on the memory that, when executed by the processor, cause the computing environment to carry out one or more disclosed methods. As [but one] *an* example, an unmanned aerial system comprises such a computing environment. For example, an unmanned aerial system can comprise a processor and a memory containing instructions that, when executed, cause the unmanned aerial system to perform a method for providing information to a user, the method comprising: determining a position of the unmanned aerial system within a space and transmitting from the unmanned aerial system a signal containing a unique identification code corresponding to the unmanned aerial system and an encoded form of the position of the unmanned aerial system.

According to a third aspect, this application discloses a computing environment and methods for identifying and/or determining a position of an unmanned aerial vehicle. According to the third aspect, a ground-based or aerial system, manned or unmanned, can receive a signal of the type transmitted by an unmanned aerial vehicle. As [but one] *an* example, a mobile device located within range of a transmitter of an unmanned aerial system can receive the signal and save a unique identification code corresponding to the unmanned aerial system, along with, for example, global positioning system data or other positional data, and, in some instances, other sensor data, contained in the signal. In some embodiments, the mobile device can retrieve information from at least one database using the identification code in the signal wherein the information retrieved by the mobile device is gated through a credentialing system that is a function of the privileges of the user. The mobile device can display on the mobile device the unmanned aerial system owner and system information associated with the identification code in one or more of the at least one database. The mobile device can embody a computing environment as disclosed herein.

Additional advantages of the inventive subject matter will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the inventive subject matter.

Other embodiments are contemplated in the Detailed Description below, the appended Figures, and in the claims, as originally written or amended, the claims as such being incorporated by reference into this Summary. The foregoing is not intended to be an exhaustive list of embodiments and features of the inventive subject matter. Persons skilled in the art can appreciate other embodiments and features from the following detailed description in conjunction with the drawings.

BRIEF DESCRIPTION OF THE DRAWINGS

The accompanying drawings, which are incorporated into and constitute a part of this specification, illustrate one or more embodiments of the inventive subject matter and, together with the detailed description, serve to explain the principles and implementations of the invention.

REFERENCE NUMERALS IN DRAWING FIGURES

Figure 1:
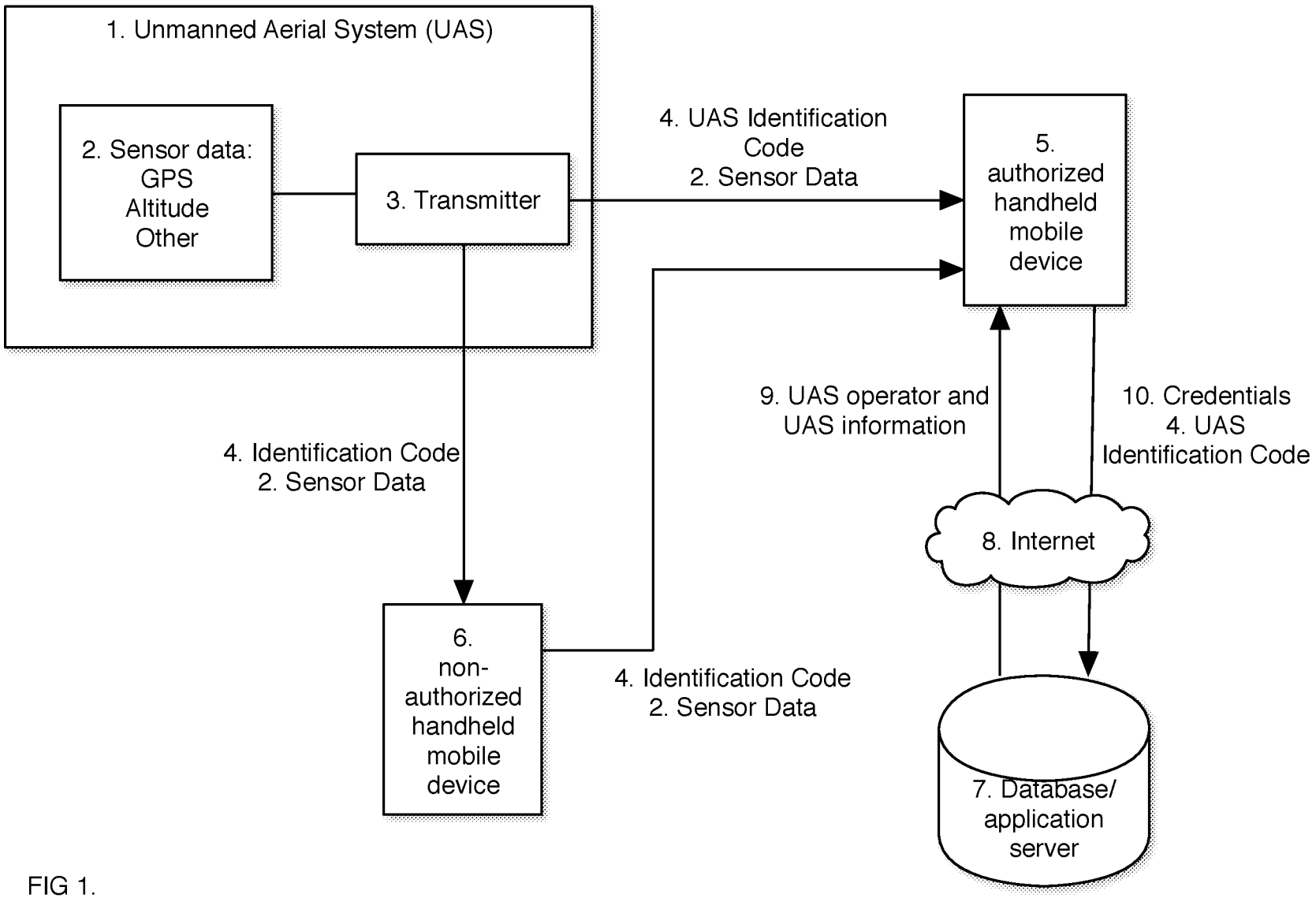
FIG. 1 is a block diagram that illustrates the components of a close proximity notification system configured in accordance with an embodiment of the inventive subject matter.

1. Unmanned Aerial System (UAS)
2. Sensor Data
3. Transmitter
4. UAS Identification Code
5. Authorized Handheld Mobile Device
6. Unauthorized Handheld Mobile Device
7. Database/application server
8. Internet
9. UAS and UAS Operator information
10. User credentials
11. On Button
12. Off Button
13. Starred Button
14. Settings
15. UAS in Range List
16. Recent UAS IDs
17. Map
18. UAS location
19. Mobile handheld device location
20. UAS Track while in range and recording
21. Time and Date of Track
22. Send Data to authorized device
23. Search
24. List of UAS ID Codes

DETAILED DESCRIPTION

As a preface to the following detail and description of the inventive subject matter when appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

Described herein are methods, systems and devices for close location provision of information to a mobile device (e.g., a mobile phone, smart phone, tablet computer system or similar device) from an unmanned aerial system. The information is any information related to and broadcast by an unmanned aerial system. In one embodiment, as a user of a mobile device comes into proximity of an unmanned aerial system, the identification code and sensor information of the unmanned aerial system is displayed and recorded on the user's mobile device. In another embodiment, an authorized user, can use the mobile device to query an unmanned aerial system database/application server with the unmanned aerial system identification code and retrieve the unmanned aerial system owner's information.

A close proximity notification system configured in accordance with embodiments of the inventive subject matter may, thus, be used to record the [UAS] *Unmanned Aerial System* (*UAS*) identification code and sensor data of the unmanned aerial system and identify, in real time or later, the unmanned aerial system and the owner of the unmanned aerial system.

FIG. 1 diagrammatically illustrates, a general scheme for providing of information to a mobile device in accordance with one possible embodiment of the inventive subject matter. A mobile device 5 is capable of establishing Internet or other network connections (e.g., over a mobile phone telecommunication carrier's network and/or a wireless local area network (WLAN), or other means), is equipped with short-range (e.g., in some cases 0-3000 meters, or 0-1500 meters, or 0-1000 meters, or 0-750 meters, or 0-500 meters, or 0-300 meters, or 0-250 meters, or 0-150 meters, or 0-75 meters, or 0-50 meters, or 0-25 meters) communications hardware, software and/or firmware compatible, or is compliant, with a short-range wireless communication protocol (e.g., Bluetooth™, RFID or other wireless method), and is programmed with a software application or firmware configured for use with the close proximity notification schemes described herein. In some instances, the mobile device may employ custom hardware to facilitate use of the close proximity notification schemes, however, in most instances such schemes will be facilitated through software applications capable of being executed by one or more processors of the mobile device. As is familiar to owners of mobile devices, such as smart phones and tablet computer systems, applications intended for use on or with mobile devices are commonly available for download to mobile devices from one or more "app" stores (e.g., web sites from which software purchases can be made) operated by service providers such as Apple, Inc., Google, Inc., and others Applications compatible with the close proximity notification schemes described herein may be provided or made available for download through such means. In other instances, the applications may be pre-installed when the mobile device is purchased (e.g., as a stand-alone application or an embedded resource within a mobile device's operating system).

Also shown in FIG. 1 is a short-range wireless transmitter 3 for transmitting within a selected short range. The wireless transmitter 3 is mounted on or otherwise integrated with an unmanned aerial system 1. One possible wireless signal is Bluetooth, but others are known and possible. When activated, the transmitter 3 broadcasts a short range wireless signal that includes [the] *a* UAS [identification code] *Identification Code* 4 and sensor data 2 from the unmanned aerial system 1. When an unmanned aerial system 1 with transmitter 3 passes within a relatively short distance, e.g., an area of approximately 0-500 meters radius of the handheld mobile device 5, 6, the handheld mobile device 5, 6 receives the broadcast, and the close proximity notification application running on the mobile device stores the UAS identification Code 4 and selected sensor data 2.

An authorized mobile device 5 is further in wireless communication, e.g., via the Internet or other communications network or network of networks 8, with a database/application server 7. That is, having received the broadcast from transmitter 3, the application running on the mobile device seeks to establish communication with the database/application server 7. Upon successfully contacting the server and providing appropriate credentials 10, a UAS Identification Code 4 stored by the close proximity notification application running on the authorized mobile device 5 is transmitted (e.g., under the control of the close proximity notification application) from the mobile device to database/application server 7. An authorized user may choose to automatically look up a UAS [identification code] *Identification Code* or choose which UAS identification codes to look up.

In another embodiment the UAS transmits telemetry and identification data directly to the database/application service server through the internet over a licensed spectrum wireless connection.

In another embodiment the UAS telemetry and identification data is transmitted to a device that is licensed spectrum capable, then is published via the device over licensed spectrum to the database/application service server.

In another embodiment, the authorized mobile handheld device accesses UAS telemetry and identification data provided to the database/application from the UAS over a licensed spectrum connection or via a mobile device that [provided] *provides* the UAS telemetry and identification data to the database/application over a licensed spectrum connection.

The database/application server 7 stores in a database information regarding the UAS [identification code] *Identification Code* 4 and the associated unmanned owner/operator and UAS information 9. Hence, upon receiving of the UAS Identification Code, the database/application server 7 will look up the UAS Identification Code and return the unmanned aerial system owner/operator information and UAS information 9 associated with the UAS Identification Code 4.

This point bears further attention-unlike wide area transmitters attached to unmanned aerial systems, the use of a short-range wireless transmitter 3 ensures that any mobile device 5 that receives information from the unmanned aerial system 1 is located within close proximity to the physical location of the unmanned aerial system 1. This reduces the chance that a handheld mobile device 5, 6 will receive a signal from unmanned aerial systems that are not near the handheld mobile device. Otherwise, the close proximity notification application on the handheld mobile device could be overwhelmed with the number of UAS Identification Codes [5] *4*. Accordingly, what is considered short range may depend in part on known or expected UAS density in a given area.

A non-authorized handheld mobile device 6 that cannot provide the proper credentials 10 will not be allowed access to the database/application server 7. However, the non-authorized handheld mobile device 6 will still be able to store the UAS identification Code 4 and sensor data 2. The non-authorized handheld mobile device 6 can, however, transfer the UAS Identification Code 4 and sensor data 2 to an authorized handheld mobile device 5. The authorized handheld mobile device 5 can then send the UAS [identification code] *Identification Code* 4 to the database/application server 7.

However, the UAS owner/operator and UAS information 9 will not be transmitted to the non-authorized handheld mobile device 6.

Transmitter

The transmitter 3 can be any suitable transmitter that may be attached to, or integrated with, an unmanned aerial system. The transmitter may be self-contained, or may be part of another electronic device. The transmitter may be powered by at least one power supply, such as a battery, and/or by external power. The transmitter may be attached to the unmanned aerial system 1 by any suitable means, non-limiting examples of which include a double-sided tape, hook and loop fastener (e.g., Velcro™ fastener), a mechanical fastener, or may be an embedded system as part of the unmanned aerial system 1.

The transmitter 3 mounted on or integrated with the unmanned aerial system 1 may be confronted with any suitable technology, including, but not limited to, Bluetooth, BLE (Bluetooth low energy) RFID (radio frequency identification), ZigBee™, Wibree™, UWB (ultra-wideband), WUSB (wireless USB), or other WLAN (wireless local area network) technology. The signal transmitted from the unmanned aerial system 1 may be limited to the effective range of the transmission technology. The effective range, strength, duration, *and* frequency of the signal transmitted from the unmanned aerial system 1 may change, and may be modified. The signal can be sent continuously or at a set interval. However, the unmanned aerial system 1 must transmit a signal while it is turned on.

When a handheld mobile device is located in sufficient proximity to the transmitter 3, the mobile device is able to receive the transmitted signal. The handheld mobile device is configured with hardware, software, and/or firmware capable of decoding the transmitted signal [for us] in subsequent steps of processing identification and sensor data. The effective reception distance which allows for such operation may be more or less than about 500 M and may vary depending upon environmental conditions and the technology used.

Mobile Device and Close Proximity Notification Application

The mobile device can be based on any operating system, including, but not limited to Apple Inc.'s iOS™, Google Inc.'s Android™, Microsoft Corp.'s Windows Phone™, Nokia Corp.'s Symbian™, or Research In Motion Limited's BlackBerry™ operating system, or an embedded Linux operating system such as Maemo™ or MeeGo™. Non-limiting examples of mobile devices capable of being used in accordance with the inventive subject matter include, a mobile phone (which may or may not be a "smart" phone), a GSM-enabled mobile phone, a CDMA-enabled mobile phone, a GPRS-enabled mobile phone, a mobile phone with a camera, a mobile phone with browser capabilities, a portable GPS (Global Positioning System) unit (whether embodied as a mobile phone or otherwise), a tracking unit, a portable computer system (such as a laptop computer, notebook computer, netbook computer, tablet computer, mini tablet computer, or other portable computer system), a personal digital assistant (PDA), [an] *a* portable audio or audio-video player, a portable camera, a pager, a portable gaming device, an electronic watch, an electronic keychain fob, or other device capable of executing the close proximity notification application or having dedicated hardware for performing the operations thereof.

The close proximity notification application is, in one possible embodiment, intended for download and installation on a compatible mobile device. When installed and running on the mobile device, the application may provide notifications to the user of the mobile device as he/she moves into proximity of an unmanned aerial system 1. These notifications may be delivered under a "push" paradigm, without need for a user to specifically request *the* same before they are delivered. For instance, a push notification may advise the user that he/she is in close proximity to an unmanned aerial system 1 (i.e., within the effective reception distance discussed above) to the user.

In some instances, the notification requires no response from the user. In other instances, the notifications may be saved and stored for easy retrieval. Users may set the number of instances or notifications to keep or for how long to keep data.

Figure 2:
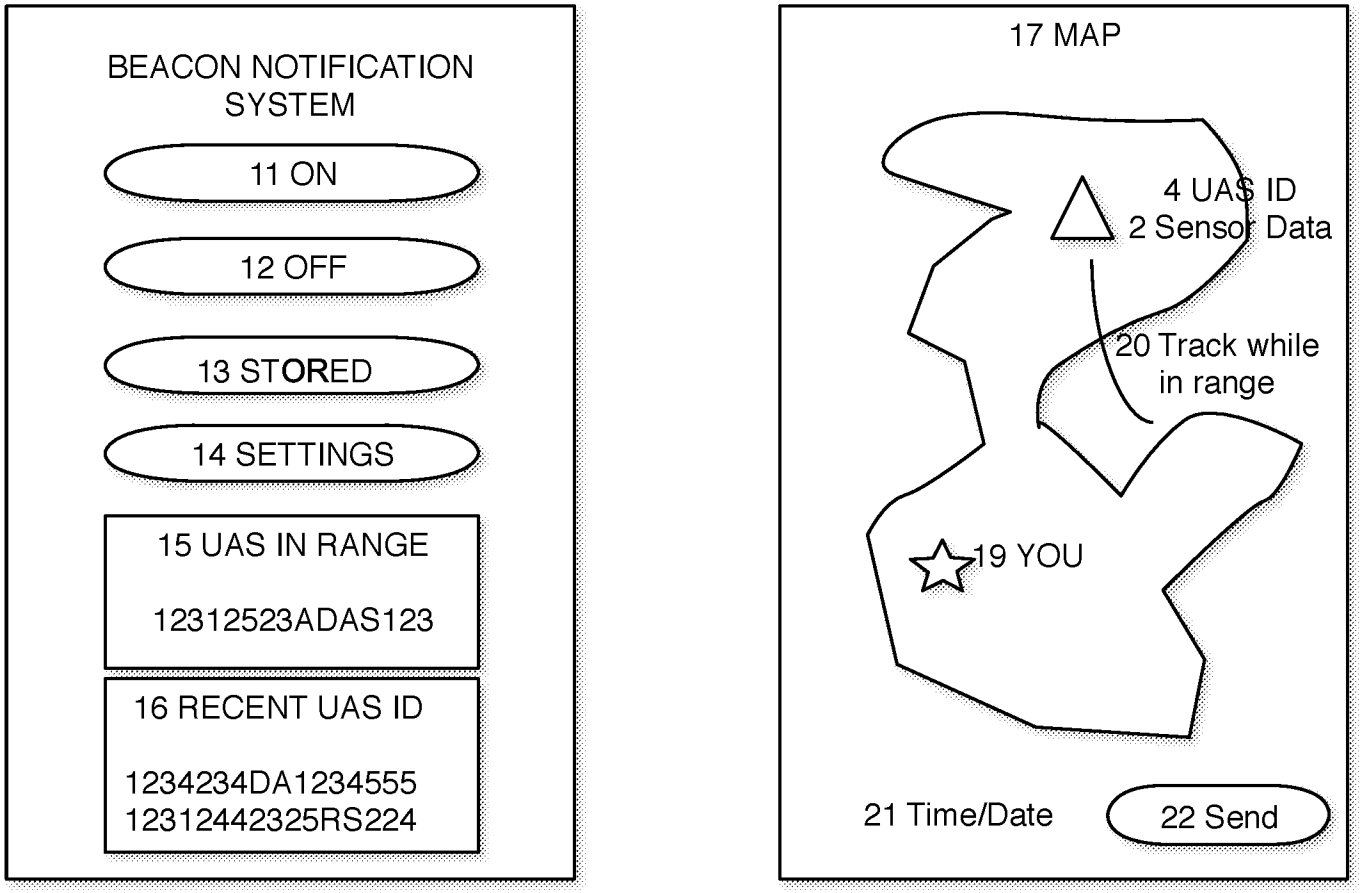
FIGS. 2 [through] *and* 3 show various screens of a mobile device close proximity notification system configured in accordance with the embodiments of the inventive subject matter.

FIG. 2 illustrates an example of a graphical user interface for an embodiment of the close proximity notification application, as may execute on an unauthorized handheld mobile device. The interface shows various possible functions and features that may be configured into a mobile device software, firmware, hardware, and/or other computing environment, as described below. In particular, FIG. 2[.] is an example of a "home" screen and "map" screen.

1) On 11 activates the application to actively receive and save UAS Identification Codes 4 and sensor data 2 from unmanned aerial systems 1 within range.
2) Off 12 disables the application so UAS Identification Codes 4 and sensor data 2 from unmanned aerial systems 1 within range are not tracked nor saved.
3) Stored 13 brings up a list of saved UAS Identification Codes 4 with time and date stamps.
4) Settings 14 allows users to configure settings such as the number of UAS Identification Codes 4 to be saved, *and* whether to receive notifications when unmanned aerial systems are within range. Users may also enter their login credentials so their handheld devices are authorized.
5) UAS in Range 15 lists unmanned aerial systems 1 that are in range when the application is on 11.
6) Recent UAS IDs 16 lists UAS Identification Codes of recent unmanned aerial systems 1 in range of the handheld mobile device.
7) The map 17 shows the map of the track area and shows a track 20 of an unmanned aerial system 1 that was in range of the handheld mobile device 19. The unmanned aerial system 1 has the UAS Identification Code 4 and sensor data 2 listed next to it. The time and date of the track 21 is listed.
8) The unauthorized handheld mobile device allows the UAS Identification Code 4 and sensor data 2 to be sent to an authorized handheld mobile device. This is done by clicking send 22.

Figure 3:
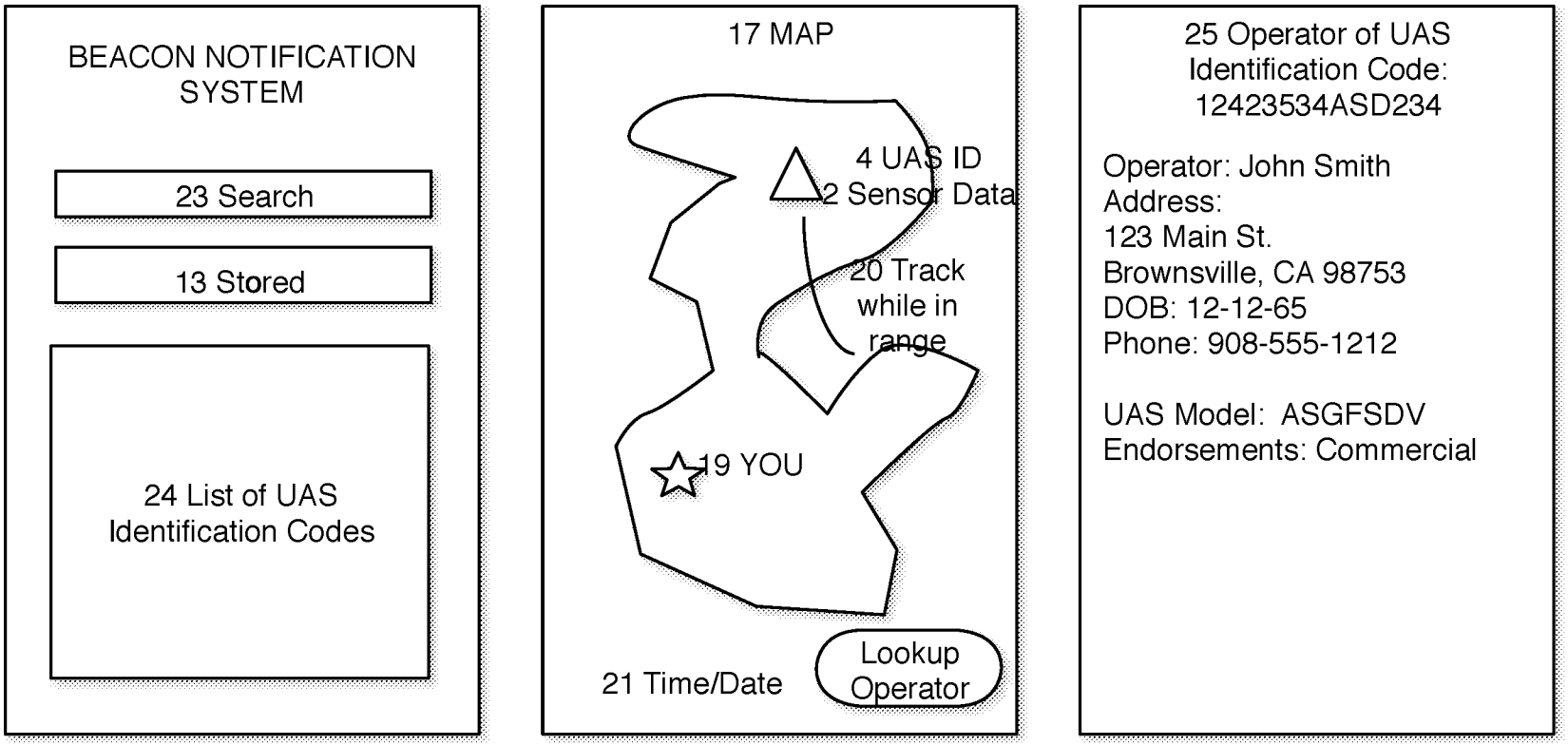

FIG. 3[.] Illustrates the UAS Identification Code lookup and retrieval screens of the authorized handheld mobile device. Typically, users must [have] input a valid username and password to access these screens. The screens show various possible functions and features that may be configured into a mobile device software, firmware, hardware, and/or other computing environment, as described below*:*

1. The search field 23 allows the user to search for UAS Identification Codes 4 or using other parameters. The starred button 13 allows the user to bring up starred UAS Identification Codes 4.
2. The map 17 is the same but allows a user to lookup the owner of the UAS using the UAS Identification Code 4.
3. The owner/operator information screen 25 shows the information tied to the UAS Identification Code 4. In this instance it gives the name, address and other information about both the owner/operator and the unmanned aerial system 1.

As persons skilled in the art will appreciate, the embodiment shown in the [Figures] *figures* is just one of many possible embodiments of the inventive subject matter, and it is not intended to be limiting.

Computing Environments

Figure 4:
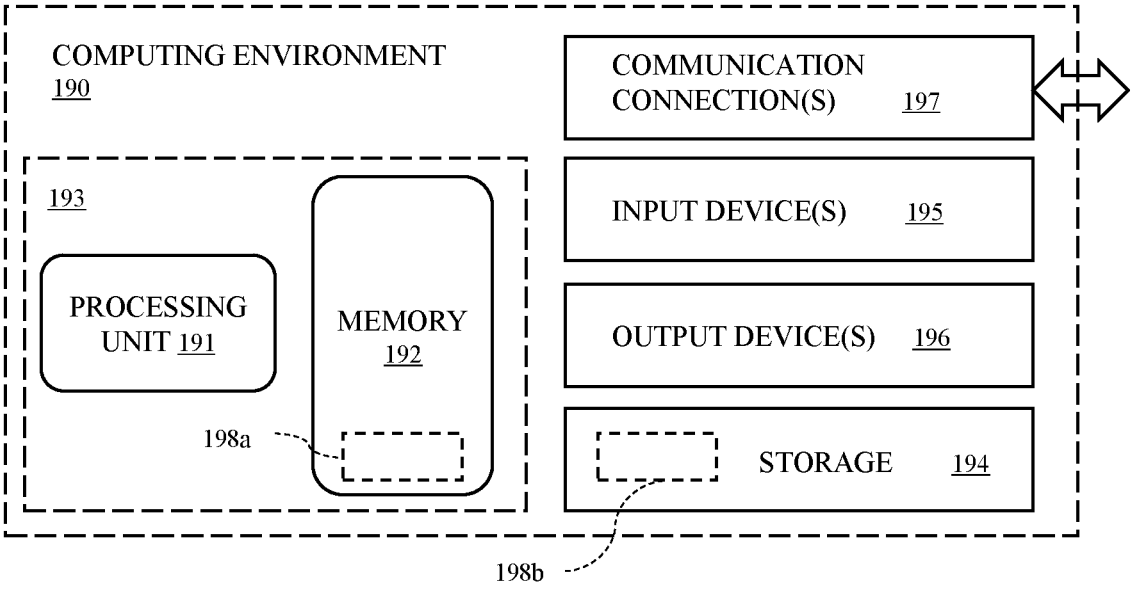
FIG. 4 illustrates a computing environment suited for carrying out one or more disclosed methods. Some disclosed close proximity notification systems include a computing environment.

FIG. 4 shows an example of a suitable architecture of a computing environment for close proximity identification. For example, the illustrated computing environment 190, in its most basic form 193, includes a processing unit 191 and a memory 192 that contains instructions the processing unit can execute to cause a close-proximity identification system to, e.g., carry out one or more aspects of a method for determining a position of an unmanned aerial system. Such methods are disclosed above.

In addition, the memory 192 can store other instructions that, when executed by the processor, cause the computing environment or an associated system to perform any of a variety of tasks as described herein FIG. 4 illustrates a generalized example of a suitable computing environment 190 in which described methods, embodiments, techniques, and technologies relating, for example, to determining a position and/or an identification of an unmanned aerial system can be implemented. The computing environment 190 is not intended to suggest any limitation as to scope of use or functionality of the technologies disclosed herein, as each technology may be implemented in diverse general-purpose or special-purpose computing environments, including within an unmanned aerial system or a ground-based system (e.g., a mobile device). For example, each disclosed technology may be implemented with other computer system configurations, including wearable and/or handheld appliances (e.g., a mobile-communications device, such as, for example, IPHONE®/IPAD® devices, available from Apple Inc. of Cupertino, Calif.), multiprocessor systems, microprocessor-based or programmable consumer electronics, embedded platforms, network computers, minicomputers, mainframe computers, smartphones, tablet computers, data centers, audio appliances, and the like. Each disclosed technology may also be practiced in distributed computing environments where tasks are performed by remote processing devices that are linked through a communications connection or network. In a distributed computing environment, program modules may be located in both local and remote memory storage devices.

The computing environment 190 includes at least one central processing unit 191 and a memory 192. In FIG. 4, this most basic configuration 193 is included within a dashed line. The central processing unit 191 executes computer-executable instructions and may be a real or a virtual processor. In a multi-processing system, or in a multi-core central processing unit, multiple processing units execute computer-executable instructions (e.g., threads) to increase processing speed and as such, multiple processors can run simultaneously, despite the processing unit 191 being represented by a single functional block.

A processing unit, or processor, can include an application specific integrated circuit (ASIC), a general-purpose microprocessor, a field-programmable gate array (FPGA), a digital signal controller, or a set of hardware logic structures (e.g., filters, arithmetic logic units, and dedicated state machines) arranged to process instructions.

The memory 192 may be volatile memory (e.g., registers, cache, RAM), non-volatile memory (e.g., ROM, EEPROM, flash memory, etc.), or some combination of the two. The memory 192 stores instructions for software 198a that can, for example, implement one or more of the technologies described herein, when executed by a processor. Disclosed technologies can be embodied in software, firmware or hardware (e.g., an ASIC).

A computing environment may have additional features. For example, the computing environment 190 includes storage 194, one or more input devices 195, one or more output devices 196, and one or more communication connections 197. An interconnection mechanism (not shown) such as a bus, a controller, or a network, can interconnect the components of the computing environment 190. Typically, operating system software (not shown) provides an operating environment for other software executing in the computing environment 190, and coordinates activities of the components of the computing environment 190.

The store 194 may be removable or non-removable, and can include selected forms of machine-readable media. In general, machine-readable media includes magnetic disks, magnetic tapes or cassettes, non-volatile solid-state memory, CD-ROMs, CD-RWs, DVDs, magnetic tape, optical data storage devices, and carrier waves, or any other machine-readable medium which can be used to store information, and which can be accessed within the computing environment 190. The storage 194 can store instructions for the software [98b] *198b* that can, for example, implement technologies described herein, when executed by a processor.

The store 194 can also be distributed, e.g., over a network so that software instructions are stored and executed in a distributed fashion. In other embodiments, e.g., in which the store 194, or a portion thereof, is embodied as an arrangement of hardwired logic structures, some (or all) of these operations can be performed by specific hardware components that contain the hardwired logic structures. The store 194 can further be distributed, as between or among machine-readable media and selected arrangements of hardwired logic structures. Processing operations disclosed herein can be performed by any combination of programmed data processing components and hardwired circuit, or logic, components.

The input device(s) 195 may be any one or more of the following: a touch input device, such as a keyboard, keypad, mouse, pen, touchscreen, touch pad, or trackball; a voice input device, such as one or more microphone transducers, speech-recognition technologies and processors, and combinations thereof; a scanning device; or another device, that provides input to the computing environment 190. For audio, the input device(s) 195 may include a microphone or other transducer (e.g., a sound card or similar device that accepts audio input in analog or digital form), or a computer-readable media reader that provides audio samples and/or machine-readable transcriptions thereof to the computing environment 190.

Speech-recognition technologies that serve as an input device can include any of a variety of signal conditioners and controllers, and can be implemented in software, firmware, or hardware. Further, the speech-recognition technologies can be implemented in a plurality of functional modules. The functional modules, in turn, can be implemented within a single computing environment and/or distributed between or among a plurality of networked computing environments. Each such networked computing environment can be in communication with one or more other computing environments implementing a functional module of the speech-recognition technologies by way of a communication connection.

The output device(s) 196 may be any one or more of a display, printer, loudspeaker transducer, DVD-writer, signal transmitter, or another device that provides output from the computing environment 190, e.g., an audio accessory 20a, 20b (FIG. 1). An output device can include or be embodied as a communication connection 197.

The communication connection(s) 197 enable communication over or through a communication medium (e.g., a connecting network) to another computing entity or accessory. A communication connection can include a transmitter and a receiver suitable for communicating over a local area network (LAN), a wide area network (WAN) connection, or both. LAN and WAN connections can be facilitated by a wired connection or a wireless connection. If a LAN or a WAN connection is wireless, the communication connection can include one or more antennas or antenna arrays. The communication medium conveys information such as computer-executable instructions, compressed graphics information, processed signal information (including processed audio signals), or other data in a modulated data signal. Examples of communication media for so-called wired connections include fiber-optic cables and copper wires. Communication media for wireless communications can include electromagnetic radiation within one or more selected frequency bands.

Machine-readable media are any available media that can be accessed within a computing environment 190. By way of example, and not limitation, with the computing environment 190, machine-readable media include memory 192, storage 194, communication media (not shown), and combinations of any of the above. Tangible machine-readable (or computer-readable) media exclude transitory signals.

As explained above, some disclosed principles can be embodied in a store 194. Such a store can include tangible, non-transitory machine-readable medium (such as microelectronic memory) having stored thereon or therein instructions. The instructions can program one or more data processing components (generically referred to here as a "processor") to perform one or more processing operations described herein, including estimating, computing, calculating, measuring, adjusting, sensing, [measuring,] filtering, correlating, and decision making, as well as, by way of example, addition, subtraction, inversion, and comparison. In some embodiments, some or all of these operations (of a machine process) can be performed by specific electronic hardware components that contain hardwired logic (e.g., dedicated digital filter blocks). Those operations can alternatively be performed by any combination of programmed data processing components and fixed, or hardwired, circuit components.

Other Embodiments

The examples described above generally concern aerial systems and/or ground-based systems to identify and to determine a position for an unmanned aerial system, and related systems and methods. The previous description is provided to enable a person skilled in the art to make or use the disclosed principles. Embodiments other than those described above in detail are contemplated based on the principles disclosed herein, together with any attendant changes in configurations of the respective apparatus described herein, without departing from the spirit or scope of this disclosure. Various modifications to the examples described herein will be readily apparent to those skilled in the art.

For example, in some embodiments, the other sensors can take the form of an orientation sensor to help an unmanned aerial system to determine a position or orientation, then adjust operation of the unmanned aerial system in accordance with that determination. In some embodiments, the orientation sensor can be a traditional inertial-based sensor while in other embodiments, sensor readings from another sensor such as a proximity sensor can be used to make an orientation determination.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,"[,] "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by reference in its entirety for all purposes.

And, those of ordinary skill in the art will appreciate that the exemplary embodiments disclosed herein can be adapted to various configurations and/or uses without departing from the disclosed principles. Applying the principles disclosed herein, it is possible to provide a wide variety of damped acoustic enclosures, and related methods and systems. For example, the principles described above in connection with any particular example can be combined with the principles described in connection with another example described herein. Thus, all structural and functional equivalents to the features and method acts of the various embodiments described throughout the disclosure that are known or later come to be known to those of ordinary skill in the art are intended to be encompassed by the principles described and the features claimed herein. Accordingly, neither the claims nor this detailed description shall be construed in a limiting sense, and following a review of this disclosure, those of ordinary skill in the art will appreciate the wide variety of ultrasonic environmental sensors, and related methods and systems that can be devised under disclosed and claimed concepts.

As used herein the terms "part,"[,] "portion,"[,] "segment,"[,] "region," "zone," "section" and like terms are generally synonymous terms and do not imply that something is or is not a discrete element or subcomponent in a larger construct or is or is not a non-discrete subdivision of a larger unitary construct, unless context indicates otherwise.

Moreover, nothing disclosed herein is intended to be dedicated to the public regardless of whether such disclosure is explicitly recited in the claims. No claim feature is to be construed under the provisions of 35 [USC] *U.S.C.* 112(f), unless the feature is expressly recited using the phrase "means for" or "step for."[.]

The appended claims are not intended to be limited to the embodiments shown herein, but are to be accorded the full scope consistent with the language of the claims, wherein reference to a feature in the singular, such as by use of the article "a" or "an" is not intended to mean "one and only one" unless specifically so stated, but rather "one or more."[.] Further, in view of the many possible embodiments to which the disclosed principles can be applied, [I reserve to] the right *is reserved* to claim any and all combinations of features and technologies described herein as understood by a person of ordinary skill in the art, including, for example, all that comes within the scope and spirit of the following claims.

What is claimed is:

1. A method for the identification of *an* unmanned aerial [systems] *system*, [said] *the* method comprising:

transmitting an identification code and sensor data from [an] *the* unmanned aerial system, wherein the identification code identifies *an owner or operator of* the unmanned aerial system and wherein the sensor data includes positional information about the unmanned aerial system;

receiving [and saving] the identification code and sensor data by an authorized handheld mobile device and by an unauthorized handheld mobile device;

transmitting authorization credentials [and], the identification code*, and the sensor data* from the authorized handheld mobile device to a database/application server;

looking up the identification code on the database/application server and matching the identification code with [an] *the* unmanned aerial system;

transmitting information identifying [an] *the* unmanned aerial system *owner or* operator associated with the identification code [and unmanned aerial system information] from the database/application server to the authorized handheld mobile device; and displaying *on the authorized handheld mobile device* the [unmanned aerial system] information [on the authorized handheld mobile device] *identifying the owner or operator of the unmanned aerial system*;

wherein the unauthorized handheld mobile device lacks authorization credentials for the database/application server and lacks access to the database/application server, and is configured to display the identification code and sensor data received from the unmanned aerial system[,] and [to present] *provide* a notification *on the unauthorized handheld mobile device* that the unauthorized handheld mobile device is in proximity to the unmanned aerial system responsive to receiving the sensor data from the unmanned aerial system;

wherein *the* sensor data comprises *at least one from among* global positioning coordinates, altitude, speed, time, date, direction, *and* other telemetry data[, or any combination thereof].

2. The method according to claim 1, wherein sensor data and identification codes are transmitted via a short-range wireless transmitter.

3. The method according to claim 1, further comprising transmitting the sensor data and identification code from the unauthorized handheld mobile device to an authorized handheld mobile device.

4. The method according to claim 1, wherein the identification code is a unique code assigned to an unmanned aerial system by a manufacturer, government agency or other public agency.

5. The method according to claim 4, wherein the identification code comprises hexadecimal code, alphanumeric code, symbolic code, binary code, encrypted code or any combination thereof.

6. The method according to claim 1, wherein the authorization credentials comprise a username and password or any other security validation method.

7. A computer system for the identification of the owner or operator of an unmanned aerial system through the use of an unmanned aerial system identification code, the computer system comprising:

a processor and a memory containing instructions that, when executed by the processor, cause the computer system to:

transmit [an] *the unmanned aerial system* identification code and sensor data from [an] *the* unmanned aerial system, wherein the *unmanned aerial system* identification code [identifies] *comprises information identifying an owner or operator of* the unmanned aerial system and wherein the sensor data includes positional information about the unmanned aerial system;

receive and save the identification code and sensor data by an authorized handheld mobile device and by an unauthorized handheld mobile device;

transmit authorization credentials [and], the identification code, *and the sensor data* from the authorized handheld mobile device to a database/application server;

look up the identification code on the database/application server and [matching] *match* the identification code with [an] *the* unmanned aerial system *and the information identifying the owner or operator of the unmanned aerial system;* transmit *the* information identifying [an] *the owner or operator of the* unmanned aerial system from the database/application server to the authorized handheld mobile device; and display the [unmanned aerial system] information *identifying the owner or operator of the unmanned aerial system and the sensor data* on the authorized handheld mobile device;

wherein the unauthorized handheld mobile device lacks authorization credentials for the database/application server and lacks access to the database/application server, and is configured to [present] *provide* a notification that the unauthorized handheld mobile device is in proximity to the unmanned aerial system responsive to receiving the sensor data from the unmanned aerial system, and to display the identification codes and sensor data received from the unmanned aerial system;

wherein sensor data comprises *at least one from among* global positioning coordinates, altitude, speed, time, date, direction, *and* other telemetry data[, or any combination thereof].

8. The computer system according to claim 7, wherein sensor data and identification codes are transmitted via a short-range wireless transmitter.

9. The computer system according to claim 7, wherein the instructions, when executed by the processor, further cause the computer system to transmit the sensor data and identification code from the unauthorized handheld mobile device to an authorized handheld mobile device.

10. The computer system according to claim 7, wherein the identification code comprises a unique code assigned to an unmanned aerial system by a manufacturer, government agency or other public agency.

11. The computer system according to claim 10, wherein the identification code comprises hexadecimal code, alphanumeric code, symbolic code, binary code or any combination thereof.

12. The computer system according to claim 7, wherein the authorization credentials comprise a username and password or any other security validation method.

13. The computer system according to claim 7, *further comprising the authorized handheld mobile device,* wherein the authorized handheld mobile device comprises:

a device processor; and a device memory containing instructions that, when executed by the device processor, cause the authorized mobile handheld device to perform a method, comprising:

receiving the identification code and sensor data pertaining to [an] *the* unmanned aerial system from the unauthorized handheld mobile device wherein the identification code identifies the unmanned aerial system and wherein the sensor data includes positional information about the unmanned aerial system;

transmitting authentication credentials and the identification code to the database/application server containing relational information between the identification code for each of a plurality of unmanned aerial systems and one or more of identification of a designated user to which each respective unmanned aerial system is registered and other information corresponding to each respective unmanned aerial system; and receiving from the database/application server an identification of the designated user corresponding to the received identification code or other information corresponding to the received identification code.

14. The computer system according to claim 13, wherein the device memory contains further instructions that, when executed by the device processor, cause the authorized handheld mobile device to present a notification indicating that the authorized handheld mobile device is in proximity to the unmanned aerial system, responsive to receiving the sensor data.

*15. A system for use with a vehicle with at least one sensor, comprising:*

*a wireless transmitter on the vehicle and structured to transmit a vehicle identification code of the vehicle and sensor data, the sensor data including at least one from among global positioning coordinates, altitude, speed, time, date, and direction;*

*an authorized mobile device having:*

*a first transceiver structured to receive the vehicle identification code and the sensor data from the wireless transmitter on the vehicle;*

*a second transceiver structured to transmit the vehicle identification code and the sensor data; and*

*an output interface structured to present the sensor data to a user of the authorized mobile device;*

*an unauthorized mobile device having a transceiver structured to receive the vehicle identification code and the sensor data from the wireless transmitter on the vehicle;*

*a remote computing device having:*

*a memory that stores computer instructions; and*

*a processor that, when executing the computer instructions, causes the remote computing device to:*

*maintain a database of authorization credentials for a plurality of authorized mobile devices, vehicle identification codes for a plurality of vehicles, and information about a responsible entity of each of the plurality of vehicles;*

*receive the vehicle identification code and the sensor data from a mobile device;*

*determine if the mobile device is the authorized mobile device and authorized to access the database based on authorization credentials received from the mobile device or if the mobile device is the unauthorized mobile device;*

*in response to determining that the mobile device is the authorized mobile device and authorized to access the database, obtain the information about the responsible entity of the vehicle based on a query of the database using the identification code;*

*transmit the information about the responsible entity associated with the identification code to the authorized mobile device; and*

*wherein the transceiver of the unauthorized mobile device is structured to transmit the vehicle identification code and the sensor data to the authorized mobile device; and*

*wherein the unauthorized mobile device lacks authorization credentials for the database of authorization credentials for a plurality of authorized mobile devices, vehicle identification codes for a plurality of vehicles, and information about a responsible entity of each of the plurality of vehicles and lacks access to database of authorization credentials for a plurality of authorized mobile devices, vehicle identification codes for a plurality of vehicles, and information about a responsible entity of each of the plurality of vehicles, and is configured to present a notification that the unauthorized mobile device is in proximity to the vehicle responsive to receiving the sensor data from the vehicle and to display the identification codes and sensor data received from the wireless transmitter on the vehicle.*

*16. The system of 15, wherein the second transceiver of the authorized mobile device is structured to transmit the vehicle identification code, the sensor data, and the authorization credentials of the authorized mobile device to the remote computing device and to receive the information about the responsible entity of the vehicle from the remote computing device.*

*17. The system of 15, wherein the output interface of the authorized mobile device is structured to present the information about the responsible entity of the vehicle to the user of the authorized mobile device.*

*18. A system for identifying an owner or operator of a vehicle through the use of a vehicle identification code that includes information about the owner or operator of the vehicle, the vehicle having at least one sensor that provides sensor data that includes at least one from among global positioning coordinates, altitude, speed, time, date, direction, and other telemetry data, the system comprising:*

*a first memory on the vehicle structured to store the vehicle identification code;*

*a wireless transmitter coupled to the first memory on the vehicle and structured to transmit the vehicle identification code and the sensor data;*

*an authorized mobile device having a receiver structured to receive the vehicle identification code and the sensor data from the wireless transmitter on the vehicle, a second memory that stores authorization credentials for the authorized mobile device, and a display structured to display the sensor data and the information about the owner or operator of the vehicle, the authorized mobile device structured to transmit the vehicle identification code and the sensor data;*

*a remote computing device that includes a processor and a third memory containing computer instructions that, when executed by the processor, cause the remote computing device to:*

*maintain a database of authorization credentials for a plurality of authorized mobile devices, vehicle identification codes for a plurality of vehicles, and information about the owner or operator of each of the plurality of vehicles;*

*receive and save the authorization credentials, the vehicle identification code, and the sensor data from the authorized mobile device;*

*obtain the information about the owner or operator of the vehicle based on a query of the database using the identification code; and*

*transmit the information about the owner or operator associated with the identification code to the authorized mobile device; and*

*an unauthorized mobile device that lacks authorization credentials for the remote computing device and is configured to receive the vehicle identification code and the sensor data from the vehicle and to provide a notification on the unauthorized mobile device that the unauthorized mobile device is in proximity to the vehicle in response to receiving the vehicle identification code and the sensor data from the vehicle and to display the received vehicle identification code and the sensor data on the unauthorized mobile device, the unauthorized mobile device further structured to transmit the vehicle identification code and the sensor data to the authorized mobile device.*

*19. A network for identifying an owner or operator of a vehicle through the use of a vehicle identification code that includes information about the owner or operator of the vehicle, the vehicle having at least one sensor that provides sensor data that includes at least one from among global positioning coordinates, altitude, speed, time, date, direction, and other telemetry data, the network comprising:*

*a plurality of authorized communication devices, each authorized communication device having a receiver structured to receive the vehicle identification code and sensor data from the vehicle, a memory that stores authorization credentials for the authorized communication device, and an output device structured to output at least one of a visual display and an audible sound of the sensor data and the information about the owner or*

*operator of the vehicle, the authorized communication device having a transmitter structured to transmit the vehicle identification code and sensor data;*

*a plurality of unauthorized communication devices, each unauthorized communication device lacks authorization credentials for a database and is configured to receive the vehicle identification code and sensor data and to provide a notification on the unauthorized communication device that the unauthorized communication device is in proximity to the vehicle in response to receiving the vehicle identification code and sensor data from the vehicle, and an output device to output at least one of a visual display and an audible sound of the received vehicle identification code and sensor data on the unauthorized communication device, the unauthorized communication device further structured to transmit the vehicle identification code and sensor data;*

*at least one remote processor that includes a memory containing instructions that, when executed by the processor, cause the at last one remote processor to:*

*maintain the database of authorization credentials, vehicle identification codes, and information about the owner or operator of the vehicle;*

*receive and save the authorization credentials, vehicle identification codes, and sensor data from the plurality of unauthorized communication devices and plurality of authorized communication devices;*

*look up the vehicle identification code and match the vehicle identification code with the vehicle and information about the owner or operator of the vehicle; and*

*transmit the information identifying the vehicle owner or operator associated with the vehicle identification code.*

*20. A system, comprising:*

*a first non-transitory computer-readable medium storing first computer instructions that, when executed by at least one first processor of an authorized mobile device, cause the at least one first processor to perform first actions, the first actions including:*

*receive a vehicle identification code of a vehicle and sensor data captured by the vehicle, the sensor data including at least one from among global positioning coordinates, altitude, speed, time, date, direction, and other telemetry data;*

*transmit the vehicle identification code, the sensor data, and authorization credentials of the authorized mobile device to a remote computing device;*

*receive information about a responsible entity of the vehicle from the remote computing device; and*

*present the vehicle identification code of the vehicle, the sensor data captured by the vehicle, and the information about the responsible entity of the vehicle received from the remote computing device to a user of the authorized mobile device;*

*a second non-transitory computer-readable medium storing second computer instructions that, when executed by at least one second processor of an unauthorized mobile device, cause the at least one second processor to perform second actions, the second actions including:*

*receive the vehicle identification code of the vehicle and the sensor data captured by the vehicle;*

*transmit the vehicle identification code and the sensor data to the authorized mobile device; and*

*present the vehicle identification code of the vehicle and the sensor data captured by the vehicle to a user of the unauthorized mobile device; and*

*a third non-transitory computer-readable medium storing third computer instructions that, when executed by at least one third processor of the remote computing device, cause the at least one third processor to perform third actions, the third actions including:*

*receive the vehicle identification code, the sensor data, and the authorization credentials from the authorized mobile device;*

*query a database for a match between the vehicle identification code and a stored vehicle identification code based on a positive authentication of the authorized mobile device using the authorization credentials; and*

*in response to a match between the vehicle identification code and the stored vehicle identification code, transmit the information about the responsible entity of the vehicle that corresponds to the stored vehicle identification code to the authorized mobile device;*

*wherein the unauthorized mobile device lacks authorization credentials for the database and lacks access to the database.*

* * * * *